United States Patent
Mihaly et al.

(10) Patent No.: US 9,480,099 B2
(45) Date of Patent: Oct. 25, 2016

(54) MOBILITY ANCHOR RELOCATION

(75) Inventors: Attila Mihaly, Dunakeszi (HU); Andras Csaszar, Budapest (HU); Christian Gotare, Getinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1028 days.

(21) Appl. No.: 13/390,374

(22) PCT Filed: Aug. 25, 2009

(86) PCT No.: PCT/SE2009/050953
§ 371 (c)(1),
(2), (4) Date: Mar. 5, 2012

(87) PCT Pub. No.: WO2011/025421
PCT Pub. Date: Mar. 3, 2011

(65) Prior Publication Data
US 2012/0188983 A1 Jul. 26, 2012

(51) Int. Cl.
H04W 36/12 (2009.01)
H04W 76/04 (2009.01)
H04W 36/00 (2009.01)
H04W 92/24 (2009.01)

(52) U.S. Cl.
CPC ........... *H04W 76/041* (2013.01); *H04W 36/12* (2013.01); *H04W 36/00* (2013.01); *H04W 92/24* (2013.01)

(58) Field of Classification Search
None
See application file for complete search history.

(56) References Cited

U.S. PATENT DOCUMENTS

| 2004/0242197 A1* | 12/2004 | Fontaine | H04W 8/183 455/411 |
| 2007/0171875 A1 | 7/2007 | Suda | |
| 2008/0043666 A1* | 2/2008 | Tamura | H04W 36/32 370/328 |
| 2008/0253332 A1* | 10/2008 | Ore | H04J 11/0069 370/331 |
| 2008/0259873 A1 | 10/2008 | Ahmavaara et al. | |
| 2008/0311911 A1* | 12/2008 | Koodli et al. | 455/436 |
| 2008/0316972 A1* | 12/2008 | Shaheen | H04W 36/0033 370/331 |
| 2009/0061855 A1 | 3/2009 | Sethi et al. | |
| 2009/0176496 A1* | 7/2009 | Li et al. | 455/437 |

(Continued)

FOREIGN PATENT DOCUMENTS

| CN | WO2009/036690 | * 3/2009 |
| JP | 2005-223711 A | 8/2005 |

(Continued)

OTHER PUBLICATIONS

Office Action and English language translation, Japanese Application No. 2012-526685, Sep. 2, 2013.
International Search Report, PCT Application No. PCT/SE2009/050953, May 17, 2010.
Written Opinion of the international Searching Authority, PCT Application No. PCT/SE2009/050953, May 17, 2010.

(Continued)

*Primary Examiner* — Kodzovi Acolatse
(74) *Attorney, Agent, or Firm* — Myers Bigel & Sibley

(57) ABSTRACT

Disclosed herein is a method, a serving node and a mobility node for relocating the mobility anchor for a mobile terminal 215a in a wireless communication system 200. The relocation comprises a request for redirecting a first bearer B-old for the mobile terminal 215a between the serving node 212b and a first mobility anchor 214a so as to create a new substantially identical second bearer B-new between the serving node 212b and a second mobility anchor 214b. In addition, the relocation comprises a transmission of a request to the first mobility anchor 214a for deleting the first bearer B-old and a transmission of a request to the second mobility anchor 214b for establishing the second bearer B-new.

12 Claims, 10 Drawing Sheets

(56) References Cited

U.S. PATENT DOCUMENTS

| | | | |
|---|---|---|---|
| 2009/0213762 A1* | 8/2009 | Guo et al. ............... | 370/254 |
| 2010/0202351 A1* | 8/2010 | Xi ............... | H04L 29/12188 370/328 |
| 2010/0238858 A1* | 9/2010 | Kim et al. ............... | 370/328 |
| 2012/0113809 A1* | 5/2012 | Cortes Gomez ............ | 370/235 |

FOREIGN PATENT DOCUMENTS

| WO | WO 2005/081428 A1 | 9/2005 |
|---|---|---|
| WO | WO 2007/144762 A2 | 12/2007 |

OTHER PUBLICATIONS

"AGW relocation in LTE_ACTIVE", R3-060424, 3GPP TSG-RAN WG3 meeting #51 bis, Apr. 3-5, 2006, Sophia Antipolis, France; pp. 1-3.

"MME/UPE Relocation based on TAU" S2-062705, 3GPP TSG SA WG2 Architecture—SAE Ad=Hoc, Aug. 23-26, 2006, Sophia Antipolis, France; pp. 1-4.

Taaghol P. et al., "Seamless integration of mobile WiMAX in 3GPP Networks", IEEE Communications Magazine, Oct. 1, 2008, vol. 46, NR 10, p. 74-85; p. 78, abstract.

* cited by examiner

MOBILITY ANCHOR RELOCATION

CROSS REFERENCE TO RELATED APPLICATIONS

This application is a 35 U.S.C. §371 national stage application of PCT International Application No. PCT/SE2009/050953, filed on 25 Aug. 2009, the disclosure and content of which is incorporated by reference herein in its entirety. The above-referenced PCT International Application was published in the English language as International Publication No. WO 2011/025421 A1 on 3 Mar. 2011.

TECHNICAL FIELD

The invention described herein relates to communication between nodes in wireless communication systems. Embodiments of the invention relate to relocation of anchor nodes in wireless communication systems. Particular embodiments of the invention relate to nodes in wireless communication systems.

BACKGROUND OF THE INVENTION

Mobility in connection with wireless communication networks is usually a precondition. The ability to move within a wireless network and/or between various wireless networks is particularly desirable in connection with wireless mobile terminals, e.g. such as cell phones or similar communication devices, or such as laptops or similar computer devices provided with wireless communication ability, e.g. equipment for communication with Wireless Local Area Networks (WLAN, e.g. WiFi), or equipment for communication Worldwide Interoperability for Microwave Access networks (WiMAX networks, based on IEEE 802.16), or equipment for communication with General Packet Radio Service system (GPRS system based on 3GPP specifications), or Universal Mobile Telecommunication System (UMTS, based on 3GPP specifications) or enhancements of the UMTS such as the Long Term Evolution (LTE) or similar.

Traditionally, upon attachment of a wireless mobile terminal to an access point, e.g. such as a base station or similar of an IP based wireless communication system, the system selects a gateway as the IP point of presence for that terminal. Once the terminal is attached it can be reached via the IP address or similar of this gateway. For example, in GPRS this gateway is the Gateway GPRS Support Node (GGSN) and in LTE this gateway is the Public Data Network Gateway (PDN Gateway or simply P-GW).

The gateway now mentioned can be seen as a mobility anchor for the mobile terminal, since it is maintained as the point of presence even if the terminal moves away to other access points, i.e. the terminal can always be reached via the IP address or similar of the IP anchor even if the terminal moves and changes its point of attachment to the wireless communication system. Indeed, the terminal remains anchored to the initial gateway, even if the movement means a relatively long distance. This kind of mobility anchors is well known in the art and they need no further description. Various mobility anchors are e.g. frequently used in connection with IPv4 and IPv6.

If the anchor gateway is far away from the mobile terminal, it may require considerable transport usage to get traffic to/from the terminal, especially in the frequent case when the mobile terminal communicates with geographically close peers or similar partners. This waste of transport resources is called the tromboning effect.

The tromboning effect is clarified with respect to FIG. 1 illustrating an exemplifying wireless communication system 100. The exemplifying system 100 comprises a plurality of Mobile Terminals 115a, 115b and a Packet System 110. The Packet System 110 comprises at least one Mobility Node Arrangement 111, a plurality of Serving Nodes 112a, 112b, a plurality of Access Points 113a, 113b, 113c, 113d and a plurality of Mobility Anchors 114a, 114b. The Mobility Anchors 114a, 114b may e.g. be Gateway Nodes or similar. The lines and arrows or similar connecting the different devices, nodes or similar arrangements of the Packet system 110 in FIG. 1 intend to illustrate connectivity between these arrangements. For example, the Packet System 110 is configured to communicate with the Mobile Terminals 115a, 115b via a radio interface. The arrangements 111, 112a, 112b, 113a, 113b, 113c, 113d, 114a, 114b within the Packet System 110 are preferably configured to communicate with each other by means of data packets, e.g. such as IP packets or similar.

Wireless communication systems as the system 100 in FIG. 1 are well known to those skilled in the art and they need no detailed explanation. Nevertheless, a brief overview of the arrangements in the system 100 will be given below.

The Access Points 113a-113d of the Packet System 110 is usually transceivers configured to communicate data packets via a wireless radio interface between the Mobile Terminals 115a, 115b and the Packet System 110.

The Mobile Terminals 115a, 115b may be any device used directly by a user to communicate with an Access Point 113a-133d. It can be a hand-held telephone, a card in a laptop computer or any other device that is configured to connect to an Access Point 113a-113d. It is assumed that the Mobile Terminals 115a, 115b moves substantially freely around the Access Points 113a-113d. It is also assumed that the Mobile Terminals 115a, 115b communicate via the Packet System 110 and the Access Points 113a-113d, i.e. the Mobile Terminals 115a, 115b do not communicate directly with each other.

The Mobility Node 111 manages the mobility functions in the communication system 100. For example, assume that a Mobile Terminal 115a moves from a first access point 113a to a second access point 113b as illustrated by dashed lines in FIG. 1. The Mobility Node 111 will then manage a transfer or a handover or similar from access point 113a to access point 113c such that the services and/or context etc associated with the Mobile Terminal 115a is now provided via access point 113c. In particular, the Mobility Node 111 is configured to manage user-data bearers Ld, Ls (to be explained further later) for communicating user-data of a Mobile Terminal 115a, 115b between a Serving Node 112a, 112b and a Mobility Anchor 114a, 114.

The Serving Nodes 112a, 112b are configured to communicate user-data for a Mobile Terminal 115a, 115b between a Mobility Anchor 114a, 114b and an Access Point 113a-113d. The Serving Nodes 112a, 112b gets orders from the Mobility Node 111 to establish, modify and release bearers between the Serving Nodes 112a, 112b on one hand and the Access Points 113a-113d respectively on the other hand, but also between the Serving Nodes 112a, 112b on one hand and the Mobility Anchor 114a, 114b respectively on the other hand.

The Mobility Anchor 114a, 114b are the interfaces between the internal IP network of the Packet System 110 and various external IP networks such as the Internet or similar Public Data Networks (PDNs) 116.

FIG. 1 intends to illustrate the movement of a mobile terminal over a long distance in that the Mobile Terminal 115a has moved from the first access point 113a to the second Access Point 113b as illustrated by dashed lines.

Now, assume that the Mobile Terminal 115a was anchored at the first Mobility Anchor 114a. It will then remain anchored at the first Mobility Anchor 114a, even if the new position at the second Access Point 113c would make it more beneficial to anchor the terminal at a second Mobility Anchor 114b being locally arranged with respect to the second access point and/or the Serving Node 112b serving the second Access Point 112b so as to enable a local flow of user-data. For example, this may be the case if the first Mobile Terminal 115a communicates with a second Mobile Terminal 115b anchored at the assumedly local second Mobility Anchor 114b as shown in FIG. 1. However, since the distant first Mobility Anchor 114a is still the anchor for the first Mobile Terminal 115a the flow of user-data between the Mobile Terminals 115a and 115b will pass through the distant first Mobility Anchor 114a and not through the local second Mobility Anchor 114b as would be preferred.

The preferred local flow of user-data between the second Mobility Anchor 114b and the second Serving Node 112b has been indicated by a solid line Ls in FIG. 1 (c.f. B-new in FIG. 2). The distant flow of user-data between the first Mobility Anchor 114a and the second Serving Node 112b has been indicated by dashed line Ld in FIG. 1 (c.f. B-old in FIG. 2).

The flow of user-data through a distant path instead of an alternative local path causes a so-called tromboning effect as previously mentioned.

One way of mitigating the tromboning effect may be to detach the Mobile Terminal 115a from the Access Point 113c and the Packet System 110 and then re-attaching it to the same Access Point 113c again while selecting a new anchor in the form of the second Mobility Anchor 114b that is more suitably located in the Packet System 110. However, this means that session continuity for the Mobile Terminal 115a and/or maintenance of the context etc for the Mobile Terminal 115a can not be guaranteed. This is typically not acceptable since session continuity is a fundamental principle in many modern wireless communication systems, e.g. such as the LTE systems and other systems according to the 3GPP specifications. In other words, this solution cannot be applied in case session continuity is to be guaranteed for a given terminal.

Hence, there is a need for an improved solution that relocates a mobility anchor while mitigating or avoiding one or several of the disadvantages touched upon above.

SUMMARY OF THE INVENTION

An improved solution for relocating a mobility anchor is provided by a first embodiment of the present invention directed to a method for relocating the mobility anchor for a mobile terminal in a wireless communication system. The method performed in a serving node comprises the steps of receiving from a mobility node a request for redirecting a first bearer for the mobile terminal setup between the serving node and a first mobility anchor, so as to create a new substantially identical second bearer between the serving node and a second mobility anchor. In addition, the method comprises the steps of transmitting to the first mobility anchor a request for deleting the first bearer, and transmitting to the second mobility anchor a request for establishing the second bearer.

Preferably, the new second bearer is created while the mobile terminal is continuously attached to the wireless communication system.

Preferably, the first bearer and the second bearer are default bearers.

The method may comprise the additional steps that the request for redirecting the first bearer to the mobile terminal is transmitted by the mobility node when the mobile terminal is more locally positioned with respect to the second mobility anchor than with respect to the first mobility anchor.

The method may comprise the additional steps that the mobility node constrains the allowable relocation frequency depending on the current number of relocations.

The method may comprise the additional steps that at least one core network router of the wireless communication system is notified about the IP address of the second mobility anchor by the second mobility anchor using a dynamic routing protocol to notify the core network routers. Alternatively, the second mobility anchor may use a management plane of the wireless communication system using policy based routing rules in the core network routers to notify these routers. In another alternative, a first tunnel may be pre-established between the first mobility anchor and a system border router, and a second tunnel may be pre-established between the second mobility anchor and the system border router, whereas a the second mobility anchor notifies the end-points of the established tunnels. In still another alternative, the second mobility anchor may notify a common root router for the first and second mobility anchors.

In addition, an improved solution for relocating a mobility anchor is provided by another embodiment of the present invention directed to a serving node arrangement. The serving node arrangement is configured to operatively communicate user-data of a mobile terminal via a first bearer established between said serving node arrangement and a first mobility anchor. The serving node arrangement is further configured to operatively receive from a mobility node a request for redirecting the first bearer and to create a new substantially identical second bearer between said serving node arrangement and a second mobility anchor. The serving node arrangement is also configured to operatively transmit to the first mobility anchor a request for deleting the first bearer, and to transmit to the second mobility anchor a request for establishing the second bearer.

In addition, an improved solution for relocating a mobility anchor is provided by still another embodiment of the present invention directed to a mobility node arrangement. The mobility node arrangement is configured to manage bearers for communicating data of a mobile terminal between a serving node arrangement and a first mobility anchor or a second mobility anchor. The mobility node arrangement is further configured to transmit to a serving node a request for redirecting a first bearer for the mobile terminal between the Serving Node and a first mobility anchor so as to enabling the creation of a new substantially identical second bearer between the serving node and a second mobility anchor.

It is preferably that the mobility node is configured to operatively transmit the request when the mobile terminal is more locally positioned with respect to the second mobility anchor than with respect to the first mobility anchor.

It is further preferred that the mobility node is configured to operatively transmit the request while the mobile terminal is continuously attached to the wireless communication system.

It is also preferably that the mobility node arrangement is configured to operatively constrain the allowable relocation frequency depending on the current number of relocations.

Further advantages of the present invention and embodiments thereof will appear from the following detailed description of embodiment the invention.

It should be emphasized that the term "comprises/comprising" or similar when used in this specification is taken to specify the presence of stated features, integers, steps or components or similar, but does not preclude the presence or addition of one or more other features, integers, steps, components or groups thereof or similar.

Similarly, the steps of the exemplifying methods described herein must not necessarily be executed in the order in which they appear. In addition, embodiments of the exemplifying methods described herein may comprise more or less steps without departing from the scope of the present invention.

DETAILED DESCRIPTION

Figure 1:
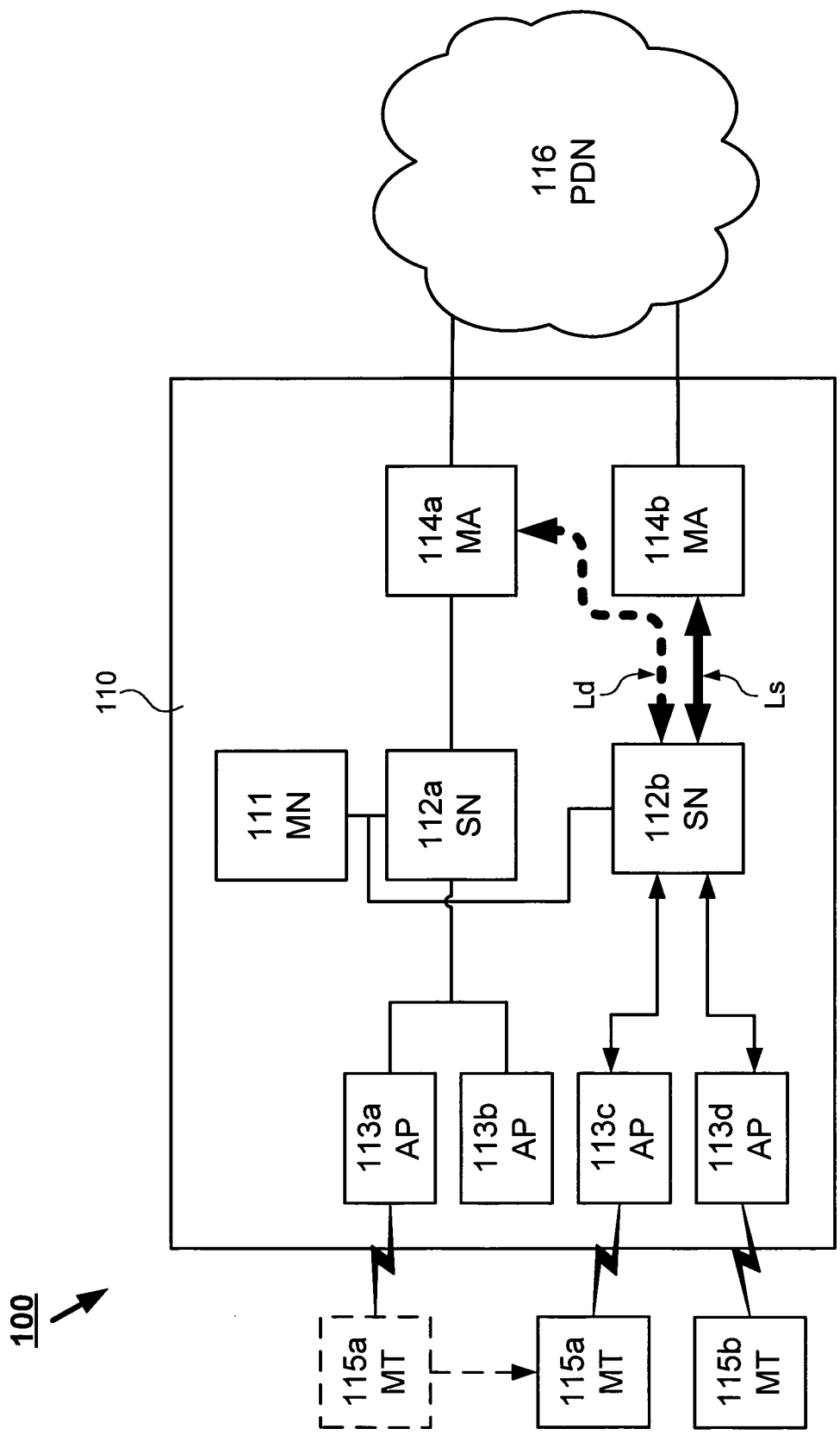
FIG. 1 is a schematic illustration an exemplifying wireless communication system 100.

Embodiments of the present invention may be implemented in the general exemplifying wireless communication system 100 of FIG. 1. Other embodiments of the present invention may be implemented in a LTE system or in a GPRS system or similar. Below, the structure of a first embodiment is described with reference to the LTE system 200 shown in FIG. 2, while referring to the corresponding features of a GPRS system.

Structure of an Embodiment of the Invention

Figure 2:
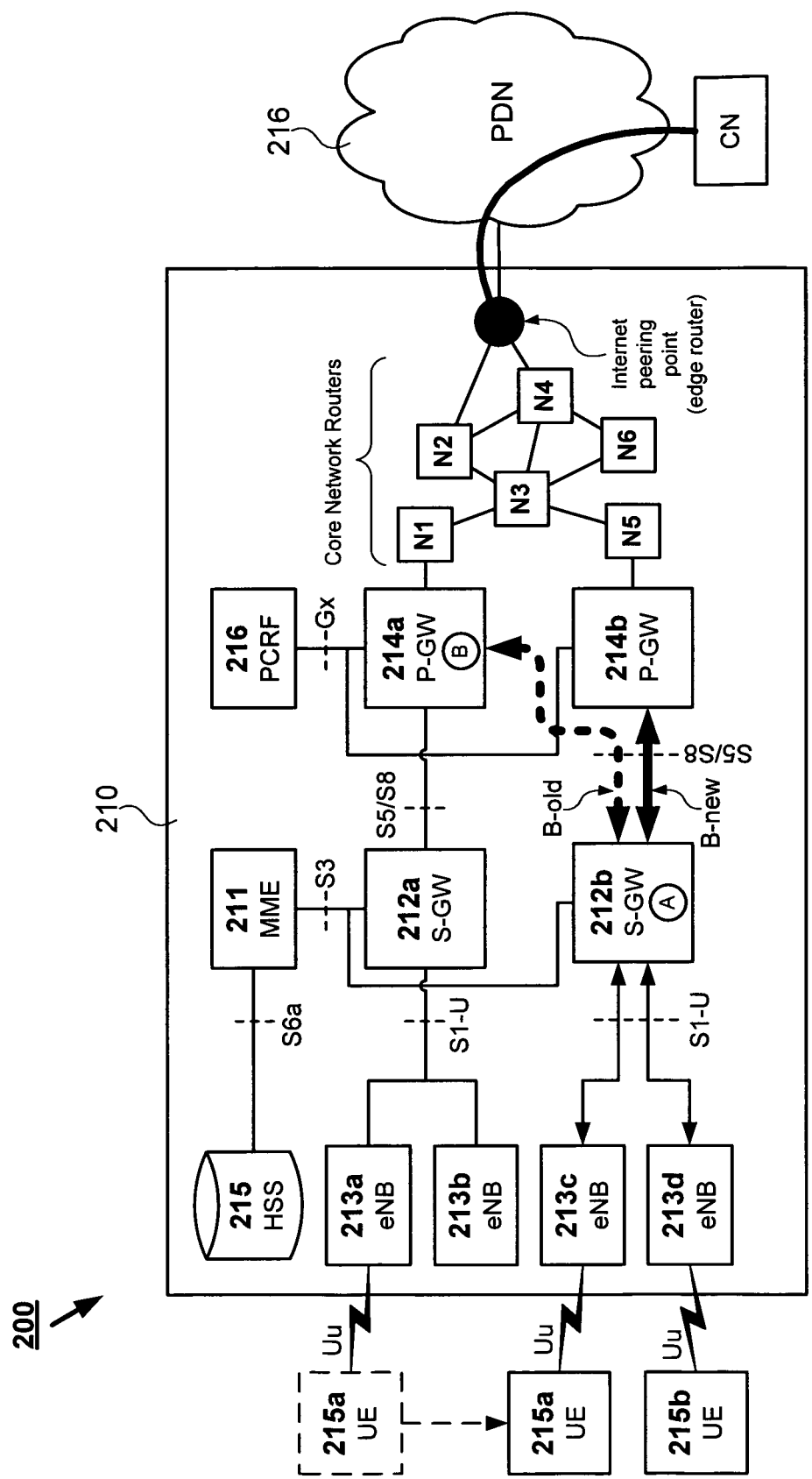
FIG. 2 is a schematic illustration an exemplifying wireless communication system in the form of a LTE system 200.

FIG. 2 illustrates an exemplifying LTE system 200 comprising a plurality of User Equipments (UE) 215a-215b and an Evolved Packet System (EPS) 210. In turn the EPS 210 comprises at least one Home Subscriber Server (HSS) 215, at least one Policy and Charging Rules Function (PCRF) 216, at least one Mobility Management Entity (MME) 211, a plurality of Serving Gateways (S-GW) 212a-212b, a plurality of enhanced Node B (eNB) 213a-213d and a plurality of PDN Gateways (P-GW) 214a-214b. It may be added that the so called Evolved Packet Core (EPC) of the LTE system 200 comprises the MME 211, the S-GW(s) 212a-212b and the P-GW(s) 214a-214b.

The exemplifying LTE system 200 in FIG. 2 is well known to those skilled in the art and it needs no detailed description. However, a short explanation will be given below of the components in the exemplifying LTE system 200 being relevant to embodiments of the present invention.

The enhanced Node B (eNB) 213a, 213b, 213c, 213d is an access point or similar configured to communicate with the UE:s 215a, 215b via a wireless radio interface Uu. The UE 215a, 215b may be any device used by a user to communicate with the EPS 210. The UE may e.g. be a hand-held telephone, a card in a laptop computer, or any other device that is configured to connect to the eNBs of the EPS.

The Mobility Management Entity (MME) 211 is responsible for the overall mobility in the LTE system 200. When a UE 215a, 215b registers, the MME 211 will request subscriber data from the HSS 215 and perform an authentication of the UE 215a, 215b. The MME 211 will also take care of signalling to and from the UE 215a, 215b by means of two different signalling protocols. This is commonly referred to as Non Access Stratum (NAS) signalling. When new bearers are to be established or existing bearers are modified, it will communicate this with the S-GW 212a, 212b. The bearers are commonly referred to as EPS bearers, wherein EPS stands for Evolved Packet System. In particular, the MME 211 is configured to manage user-data bearers B-old, B-new (to be explained further later) for communicating user-data of a UE 215a, 215b between a S-GW 212a, 212b and a P-GW 214a, 214b. When a UE 215a, 215b is registered to an MME 211, it will handle all paging functions and mobility management functions (tracking area updates etc). If a UE 215a, 215b registers in a foreign network, the MME or similar that is located in that network will obtain subscriber data from the HSS in the home network. This is referred to as roaming functions.

The main task of the S-GW 212a, 212b is to tunnel user-data between a P-GW 214a, 214b and an eNB 213a-213d. In addition, the S-GW 212a, 212b is the node in the EPS 210 that charges user-data and takes care of accounting functions (charging between operators). The S-GW 212a, 212b will get orders from the MME 211 to establish, modify and release EPS bearers.

The P-GW 214a, 214b is the interface between the internal IP network of the EPS 210 and various external Public Data Networks (PDN) 216, e.g. various IP networks such as the Internet or similar. It may be added that a S-GW and a P-GW can be combined and collocated in the same or neighbouring hardware as a matter of implementation for vendors of core networks. If the operator uses dynamic IP addresses, then the P-GW 214a, 214b is the unit that allocates and reserves IP addresses to an UE 215a, 215b currently registered to the EPS 210. The P-GW 214a, 214b is also the so called policy and charging enforcement point. The main principle is that policy and charging function verifies whether the UE 215a, 215b only sends data according to what it has requested and is allowed. The policies are transferred from the PCRF 216 to the P-GW 214a, 214b which then performs packet filtering (for example, by removing not accepted packets). If the IP address allocation is done with so-called Dynamic Host Configuration Protocol (DHCP), then the P-GW 214a, 214b will act as a DHCP relay agent.

With respect to the PCRF 216 it can be noted that there are two separate so called planes in most modern networks; one control plane and one user plane. The IP multimedia subsystem (IMS) for example, belongs to the control plane and a UE 215a, 215b will request services from the IMS system. When services are accepted, some function in the user plane must supervise that users only send the correct amount of data to the correct destination. This means that the control layer will indicate what a user is allowed to do and it is the task of the PCRF 216 to create rules for this. This is referred to as a "policy". In addition to this, the PCRF 216 will also create charging rules and send this information to the P-GW 214a, 214b.

As a matter of clarification it should be explained that the lines and arrows or similar connecting the different nodes or equipments and similar arrangements in FIG. 2 are intended to illustrate connectivity between these arrangements. The dashed lines labelled S1-U, S3, S5/S8, S6a and Gx respectively are in correspondence with the 3GPP specifications intended to illustrate that logical interfaces with the corresponding names are used for communication between said arrangements by means of said connectivity.

Before we proceed it should also be added that the arrangements in the LTE system 200 shown in FIG. 2 correspond to similar arrangement in a GPRS system. Thus the eNB corresponds to the Node B in the "old" GPRS architecture, the UE corresponds to the Mobile Station in the "old" GPRS architecture, the MME corresponds to the Mobile Switching Center (MSC) in the "old" GPRS architecture, the S-GW 212a, 212b corresponds to the SGSN in the "old" GPRS architecture, and the P-GW 214a, 214b corresponds to the GGSN in the "old" GPRS architecture.

Function of a Packet System According to a First Embodiment of the Invention

Figure 3:
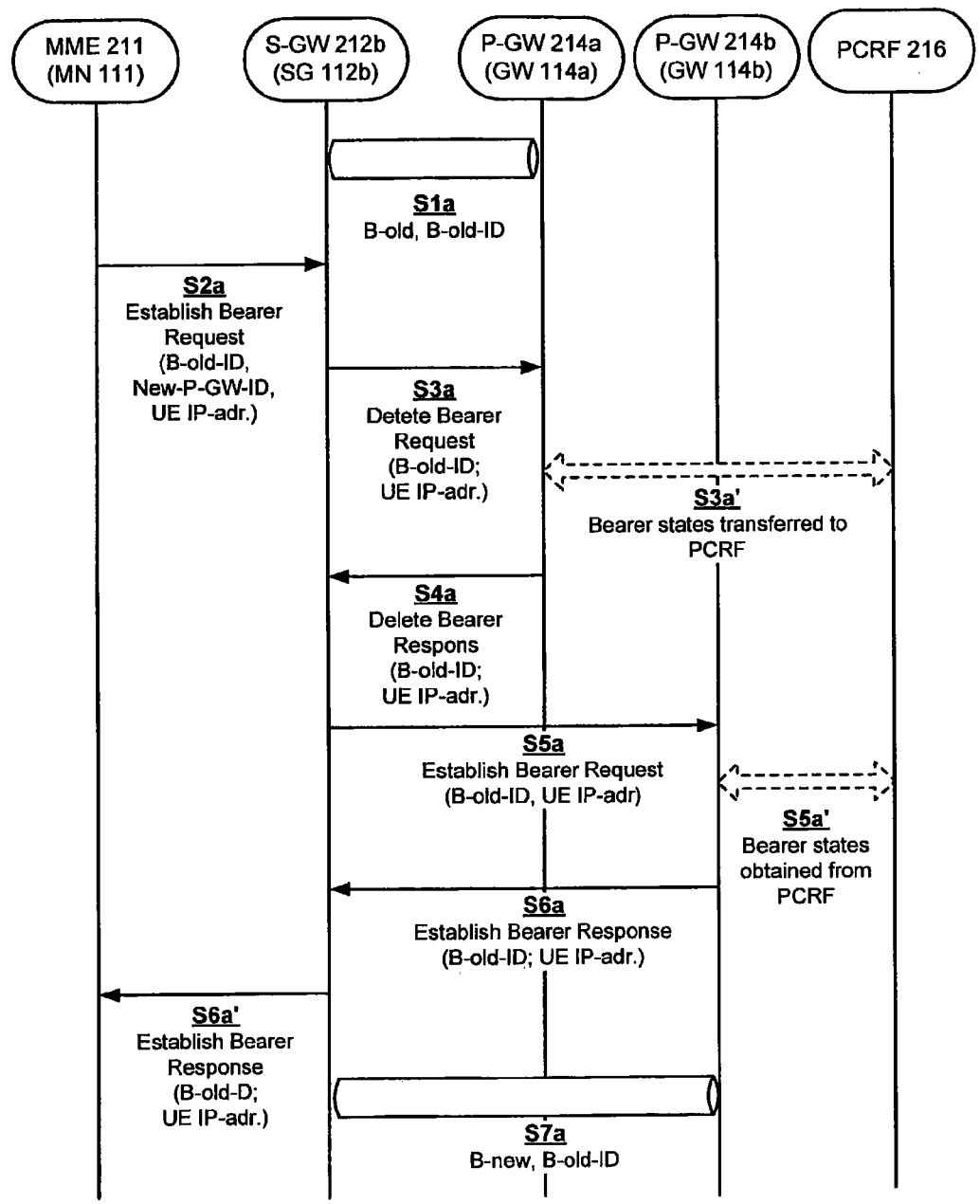
FIG. 3 is a schematic illustration of a sequence diagram illustrating the operational steps of a first embodiment of the present invention.
Figure 4:
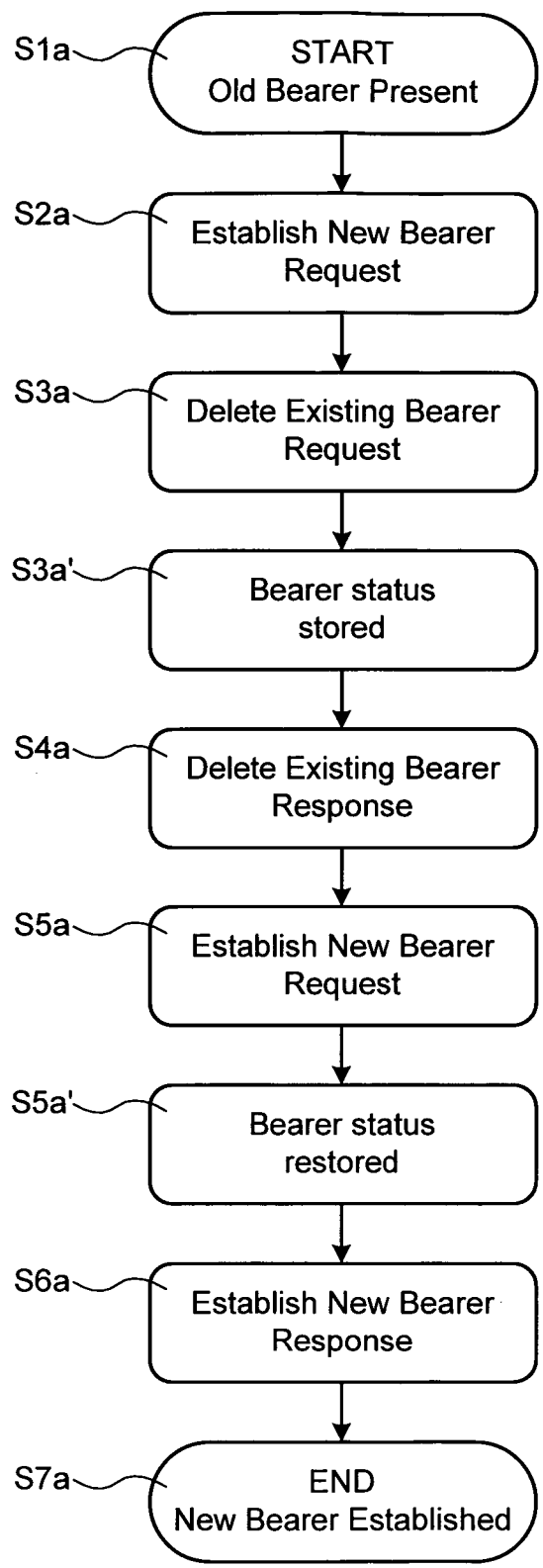
FIG. 4 is a flowchart illustrating the operational steps of the embodiment in FIG. 3.

The operation of the exemplifying LTE system 200 shown in FIG. 2 will now be described with reference to FIG. 3 showing a sequence diagram illustrating the steps of a first embodiment of the present invention, and with reference to FIG. 4 showing a flowchart illustrating the steps of the same embodiment.

In a first step S1a it is assumed that the LTE system 200 or at least the EPS 210 is activated so as to be operative. It is also assumed that a first UE 215a originally anchored at a first P-GW 214a has now moved from a first eNB 213a served by a first S-GW 212a to a second eNB 213c served by a second S-GW 212b. It is further assumed that the first S-GW 212a is locally arranged with respect to the first P-GW 212a, whereas the second S-GW 212b is locally arranged with respect to a second P-GW 214b. The expression "locally arranged" may e.g. imply that the S-GW and the P-GW in question are collocated within the same or neighboring hardware, or that they are otherwise closely arranged with respect to each other, e.g. in terms of geographical area or similar, or in terms of roundtrip delay or similar and/or in terms of communication capacity (e.g. Mbit/s) or similar.

It is also assumed that a bearer B-old is established between the first P-GW 214a and the second S-GW 212b serving the second eNB 213c to which the UE 215a is now attached. This is required for enabling communication with the UE 215a still being anchored at the first P-GW 214a. The bearer B-old is configured to communicate user-data for the first UE 215a. The bearer B-old may e.g. be implemented by means of an S5a interface as outlined in the 3GPP specifications. Typically, IP tunnels or similar may be used for implementing the bearer B-old. Further, it assumed that the bearer B-old is associated with a bearer identification B-old-ID known to the EPS 210 and the MME 211 and also by the S-GW 212b and the P-GW 214a.

In a second step S2a it is preferred that the MME 211 initiates a change of the IP anchor for the UE 215a such that the IP anchor of the UE 215a is relocated from the first old P-GW 214a to the second new P-GW 214b. The MME 211 may e.g. initiate the relocation if the new S-GW 212b is more locally positioned with respect to the new P-GW 214b than with respect to the old P-GW 214a. The MME 211 may e.g. detect this by obtaining and/or being provided with knowledge of whether the new S-GW 212b and the new P-GW 214b are collocated in the same or neighboring hardware, and/or knowledge of the geographical location or similar of the new S-GW 212b, the old P-GW 214a and the new P-GW 214b, and/or knowledge of the roundtrip delay or similar and/or the communication capacity or similar (e.g. Mbit/s) between the new S-GW 212b and the old P-GW 214a on one hand and the new S-GW 212b and the new P-GW 214b on the other.

It is preferred that the initiation of IP anchor relocation for the UE 215a in step S2a is done by the MME 211 sending a request or similar to the new S-GW 212b for establishing a new bearer B-new for the UE 215a between the new S-GW 212b and the new P-GW 214b. The request may e.g. comprise information about at least one of: the identity New-P-GW-ID of the new P-GW 214b (e.g. its IP-address or similar) and/or the identity B-old-ID of the existing bearer B-old and/or the identity UE-ID of the UE 215a (e.g. its IP-address or similar) for which the relocation is preformed. The information enables the new S-GW 212b to define the new P-GW 214b and to identify the existing bearer B-old to be deleted as will be explained below Preferably, both the new bearer B-new and the old bearer B-old are default bearers. Typically, a default bearer is the first bearer that is set up when the UE 215a attaches to the EPS 210. The UE 215a has only one active default bearer. The default bearer provides the basic connectivity between the UE 215a and the EPS 210. Preferably, the default bearer is a non-GBR bearer, i.e. a non Guarantied Bit-Rate bearer. In addition, the UE 215a may have one or more dedicated bearers.

In a third step S3a it is preferred that the new S-GW 212b recognizes that a version of the new bearer B-new requested in S2 already exists in the form of the old bearer B-old. The new S-GW 212b may e.g. recognize this based on the fact that the bearer identification B-old-ID in the request from the MME 211 in step S2a is already used by the old bearer B-old. Alternatively or additionally, the S-GW 212b may recognize this by means of other information preloaded into the S-GW 212b and/or received from other nodes or similar in the EPS 210 and/or based on operations evaluating such information.

In view of the above the new S-GW 212b preferably concludes that the existing bearer B-old has to be deleted. Thus, it is preferred that the new S-GW 212b sends a request to the old P-GW 214a for deleting the old bearer B-old. The request may e.g. comprise information about the identity UE-ID of the UE 215a and/or the identity B-old-ID of the existing bearer B-old to be deleted. The information enables the old P-GW 214a to identify and delete the existing bearer B-old.

In an optional intermediate step S3a' the old P-GW 214a may transfer the bearer states for the bearer B-old to the PCRF 216. The bearer states may e.g. include one or several of: the bearer policies, various counters, filters, firewall settings etc. Transferring the bearer states is particularly advantageous if dynamic bearer states are used. The transferred bearer states may then be obtained from the PCRF 216 at the subsequent establishment of a new bearer B-new for the UE 215a as will be further described in step S5a' below.

The intermediate step S3a' may be omitted in some embodiments. This may e.g. be the case when the old P-GW 214a uses non-dynamic bearer states or similar for the UE 215a, i.e. permanent and/or pre-set bearer states or similar. Non-dynamic bearer states may e.g. be pre-stored in the new P-GW 215b and/or obtained by the new P-GW 215b from the PCRF 216 in the same or similarly manner as during an original attachment of the UE 215a.

In a fourth step S4a it is preferred that that the new S-GW 212b receives a response or similar sent by the old P-GW 214a confirming that the old bearer B-old has been deleted or that it will be deleted shortly. The response may e.g. comprise information about the identity UE-ID of the UE 215a (e.g. its original IP-address or similar) and/or the identity B-old-ID of the old bearer B-old. The information enables the new S-GW 212b to identify that bearer B-old has been or will be deleted.

In a fifth step S5a it is preferred that the new S-GW 212b sends a request or similar to the new P-GW 214b for establishing a new bearer B-new between itself and the new S-GW 212b. The request may e.g. comprise information about the identity B-old-ID of the old bearer B-old and/or the identity UE-ID of the UE 215a (e.g. its original IP-address or similar). The information enables the new P-GW 214b to establish the requested new bearer B-new for the UE 215b between itself and the new S-GW 212b with the effect that communication of user-data for the UE 215a will be canalized via the new bearer B-new and not via the old bearer B-old.

When the establish bearer request contains the original IP address of the UE 215a this can be recognized by the new P-GW 214b with the effect that the new P-GW 214b will not allocate a new IP address for the UE 215a. Instead it will bind the new bearer B-new to the original IP address received from the S-GW 212b with the effect that communication of user-data for the UE 215a will be canalized via the new bearer B-new and not via the old bearer B-old. Binding a bearer (e.g. an IP-tunnel) to an IP-address is well known per se to those skilled in the art and it is commonly used in e.g. IPv4 and IPv6.

In an optional intermediate step S5a' the new P-GW 214b may obtain one or several bearer states of the old bearer B-old from the PCRF 216, i.e. one or several of the bearer states that were transferred to the PCRF 216 in step S3a' above. This may e.g. be done in the same or similar manner as during an initial attachment of the UE 215a.

The intermediate step S5a' may be omitted in some embodiments. This may e.g. be the case when the old P-GW 214a used non-dynamic bearer states or similar for the UE 35215a. Such bearer states may e.g. be pre-stored in the new P-GW 215b and/or obtained by the new P-GW 215b from the PCRF 216 in the same or similarly manner as during an original attachment of the UE 215a.

In a sixth step S6a it is preferred that the new S-GW 212b receives a response sent by the new P-GW 214a confirming that a new bearer B-new has been established or will be established shortly by the P-GW 214b between the new P-GW 214a and the new S-GW 212b. The response may e.g. comprise information about the identity UE-ID of the UE 215a and/or the identity B-old-ID of the established new bearer B-new.

Observe that the bearer identity of the old bearer B-old and the new bearer B-new may be the same (i.e. B-old-ID), at least in a preferred embodiment. This is appropriate, since the bearers B-old and B-new are the same or substantially the same. The main difference is that B-old communicated user-data for the UE 215a between the new S-GW 212b and the old P-GW 214a, whereas B-new communicates user-data for the UE 215a between the new S-GW 212b and the new P-GW 214b. In essence, the bearer in question has been redirected without being modified, or at least without being substantially modified.

It should also be added that the new S-GW 212b may be configured to buffer any user-data (e.g. in a buffer A, see circle in 212b of FIG. 2), received from the UE 215a. Preferably, the buffering starts at the reception of the establish bearer request in step S2a or the transmission of the delete bearer request in step S3a, and continues at least until the establish bearer response in this step S6a is received. The user-data buffered by the S-GW 212b may then be sent to the new anchor point P-GW 214b in a conventional manner once the new bearer B-new is activated.

In addition, the first mobility anchor P-GW 214a may be configured to buffer any received user-data destined for the UE 215a (e.g. in a buffer B, see circle in 214a of FIG. 2). Preferably, the buffering starts at the reception of the delete bearer request in step S3a. The buffering of any received user-data may then e.g. continue at least until the appropriate Core Network Nodes N1-N6 and/or the anchor points P-GW 214a, the P-GW 214b and/or the Edge Router 710 have been notified about the new anchor point P-GW 214b for the UE 215a as described in the section "Routing in Connection with Anchor Relocation" below. The user-data buffered by the old anchor point P-GW 214a may then be sent to the new anchor point P-GW 214b via an IP tunnel or some other IP connectivity or similar, e.g. such as the tunnel T3 established between the P-GW 214a and the P-GW 214b as described below with reference to FIG. 9.

In an extended sixth step S6a' it is preferred that the MME 211 receives a response sent by the new S-GW 212b confirming that a new bearer B-new has been established or will be established shortly. The response may e.g. comprise information about the identity UE-ID of the UE 215a and/or the identity B-old-ID of the established new bearer B-new. This enables the MME 211 to identify the deleted bearer B-old. For the MME 211, this concludes the change of IP anchor for the UE 215a initiated in step S2a above.

In a seventh step S7a it is preferred that the method is ended. If the new bearer B-new has not been previously established it will be established in step S7a at the latest. Conversely, step S7a is not executed before the new bearer B-new has been established.

It should be understood that the steps S1a-S7a of the exemplifying method now described may be repeated for each movement of the UE 215a or similar Mobile Terminal.

It should also be added that the first embodiment described above with reference to the LTE system 200 in FIG. 2 applies mutatis mutandis with respect to the wireless communication system 100 in FIG. 1. Thus, in case the embodiment described above is implemented in the system 100 it is evident that steps S1a-S7a (where applicable) applies mutatis mutandis to the Mobility Node Arrangement 111 (c.f. the MME 211), the Serving Node Arrangements 112a, 112b (c.f. S-GW 212a, 212b), the Mobility Anchor arrangements 114a, 114b (c.f. the P-GW 214a, P-GW 214b), the Mobile Terminal 115a (c.f. the UE 215a), the new user-data bearer (c.f. B-new) and the old user-data bearer Ld (c.f. B-old).

Function of a Packet System According to a Second Embodiment of the Invention

In order to avoid double communication with the PCRF 216 caused by the intermediate steps S3a' and S5a' as described above, an advantageous embodiment of the present invention is based on a substantially direct transfer of bearer states between the old P-GW 214a and the new P-GW 214b.

Figure 5:
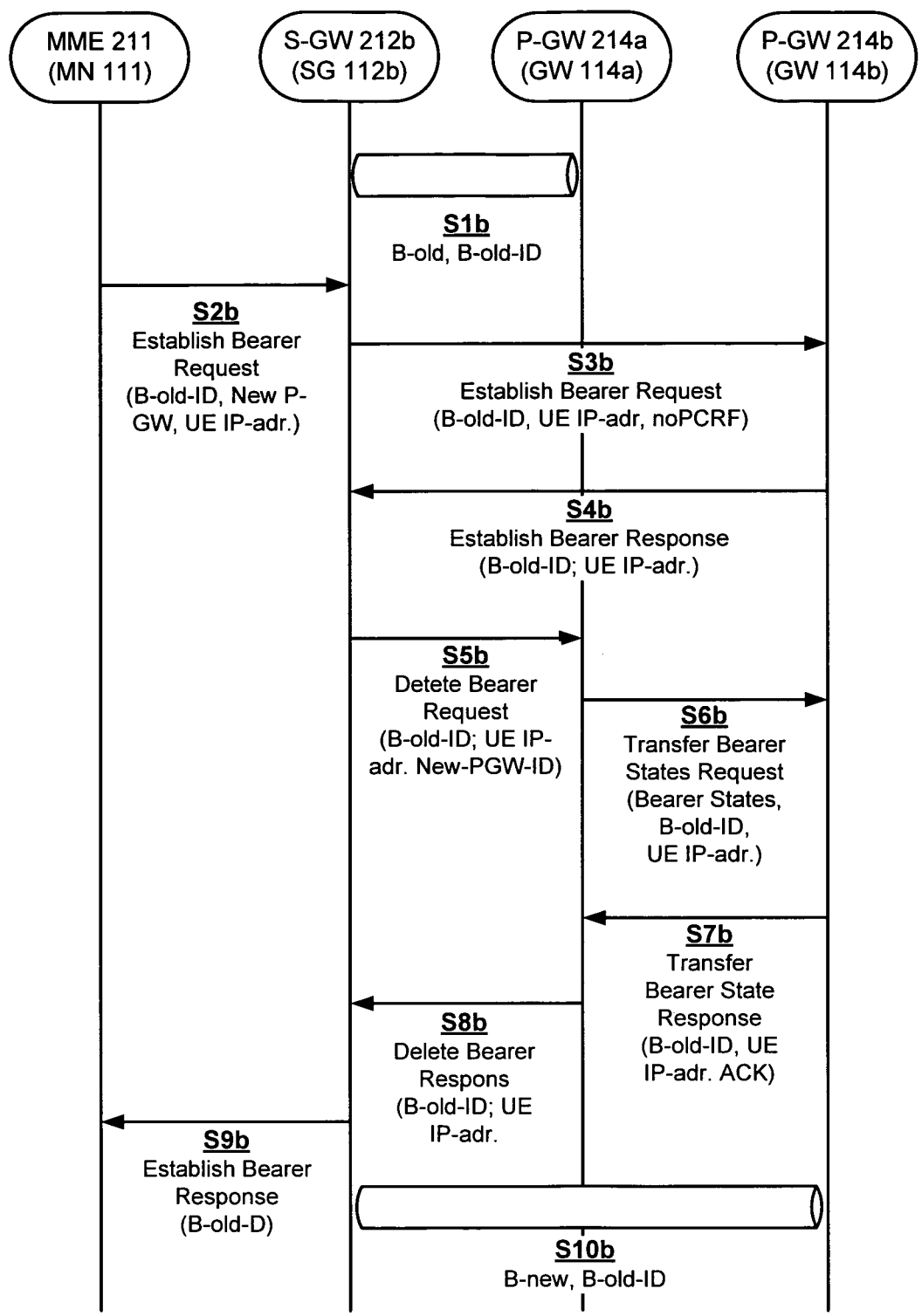
FIG. 5 is a schematic illustration of a sequence diagram illustrating the operational steps of a second embodiment of the present invention.
Figure 6:
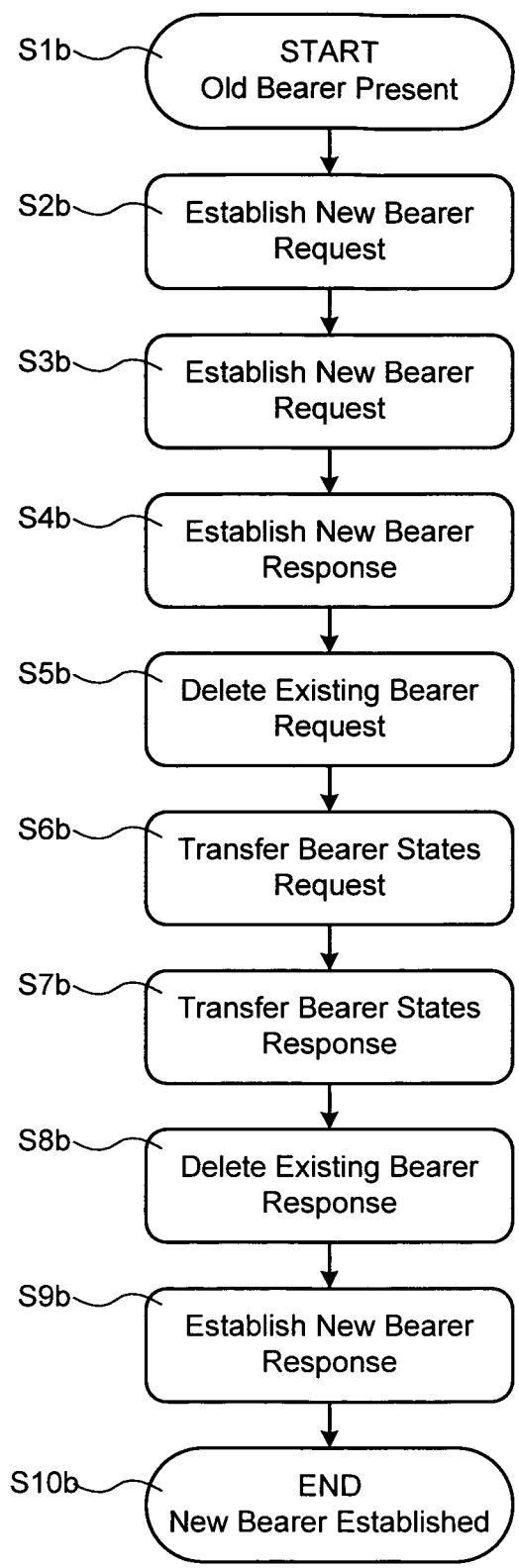
FIG. 6 is a flowchart illustrating the operational steps of the embodiment in FIG. 5.

In view of this the functions of the exemplifying LTE system 200 in FIG. 2 will now be described with reference to FIG. 5 showing a sequence diagram illustrating the operational steps of a second embodiment of the present invention, and with reference to FIG. 6 showing a flowchart illustrating the operational steps of the same second embodiment.

The functional steps of the second embodiment shown in FIGS. 5 and 6 correspond to the functional steps of the first embodiment shown in FIGS. 3 and 4 according to the following:

| 2nd Embodiment | 1st Embodiment |
|---|---|
| S1b | S1a |
| S2b | S2a |
| S3b | S5a |
| S4b | S6a |
| S5b | S3a |
| S6b | S3a' |
| S7b | — |
| S8b | S4a |
| S9b | S6a' |
| S10b | S7 |

In this second embodiment, the old P-GW 214a transfers the bearer states for the existing bearer B-old directly to the new P-GW 214b. Thus, the new P-GW 214b must be ready to receive the bearer state for the existing bearer B-old from the old P-GW 214a. This is preferably accomplished in that the new S-GW 212b sends the establish bearer request to the new P-GW 212b in step S3b before sending the delete bearer request to the old P-GW 214a in step S5b. It is preferred that the new S-GW 212b provides an indication (e.g. a flag noPCRF) in the establish bearer request (S3b) informing the new P-GW 214b that it should prepare to receive bearer states for the existing bearer B-old from the old P-GW 214a. Thus, the new P-GW 214b should not interact with the PCRF 216 for this purpose. In addition, the delete bearer request (S5b) sent by the new S-GW 212b should also be modified so as to comprise the identity New-PGW-ID or similar of the new P-GW 214b enabling the old P-GW 214a to transfer bearer states for the existing bearer B-old to the appropriate P-GW 214b.

As can be seen in the table above, step S6b correspond to step S3a' in the first embodiment shown in FIG. 3. However, in present step S6b the old P-GW 214a transfers bearer states for the bearer B-old directly to the new P-GW 214b, i.e. not to the PCRF 216 as in step S3a' of FIG. 3. The request for transfer bearer states in step S6b may, in addition to bearer states as such, e.g. comprise information about the bearer identification B-old-ID or similar of the existing bearer B-old and/or the identity the UE 215a (e.g. its IP-address or similar) for which the anchor relocation is preformed. This enables the new P-GW 214b to associate bearer states of the old bearer B-old with the new bearer B-new.

Step S7b has no direct correspondence in the first embodiment shown in FIG. 3. In step S7b it is preferred that that the new P-GW 214b sends a response or similar to the old P-GW 214a confirming that the bearer states for the old bearer B-old has been received. The response may e.g. comprise information about the identity of the UE 215a (e.g. its IP-address or similar) and/or the bearer identification B-old-ID or similar of the old bearer B-old and/or an Acknowledgement (ACK). The information enables the old P-GW 214a to identify that the bearer states for the existing bearer B-old has been successfully received by the new P-GW 214b. The old P-GW 214a may then delete the existing bearer B-old.

The second embodiment described above with reference to the LTE system in FIG. 2 applies mutatis mutandis with respect to the wireless communication system 100 in FIG. 1. Thus, in case the second embodiment is implemented in the system 100 it is evident that steps S1b-S10b (where applicable) applies mutatis mutandis to the Mobility Node Arrangement 111 (c.f. the MME 211), the Serving Node Arrangements 112a, 112b (c.f. S-GW 212a, 212b), the Mobility Anchor arrangements 114a, 114b (c.f. the P-GW 214a, P-GW 214b), the Mobile Terminal 115a (c.f. the UE 215a), the new user-data bearer (c.f. B-new) and the old user-data bearer Ld (c.f. B-old) of which both may be default bearers.

Routing in Connection with Anchor Relocation

When the anchor point is changed for a Mobile Terminal such as the UE 215a in FIG. 2, we face the classical IP mobility problem, i.e. how to inform devices and networks etc about the new IP address at which the Mobile Terminal can now be reached?

During an initial attachment to the old P-GW 214a, the UE 215 normally gets an IP address from the pool of IP addresses available to the P-GW 214a. The P-GW 214a is therefore responsible for a bigger subnet, or a shorter (e.g. /20 or /22) prefix. Therefore, possible core network routers must not be aware of the current position of the individual UE:s, since the mobility is hidden below the P-GW anchor points.

However, if the P-GW anchor point is changed for an UE such as the UE 215a in FIG. 2, we face the classical IP mobility problem mentioned above. Fortunately, the mobility problem is constrained within the EPS 210 of the LTE system 200 in FIG. 2.

Figure 7:
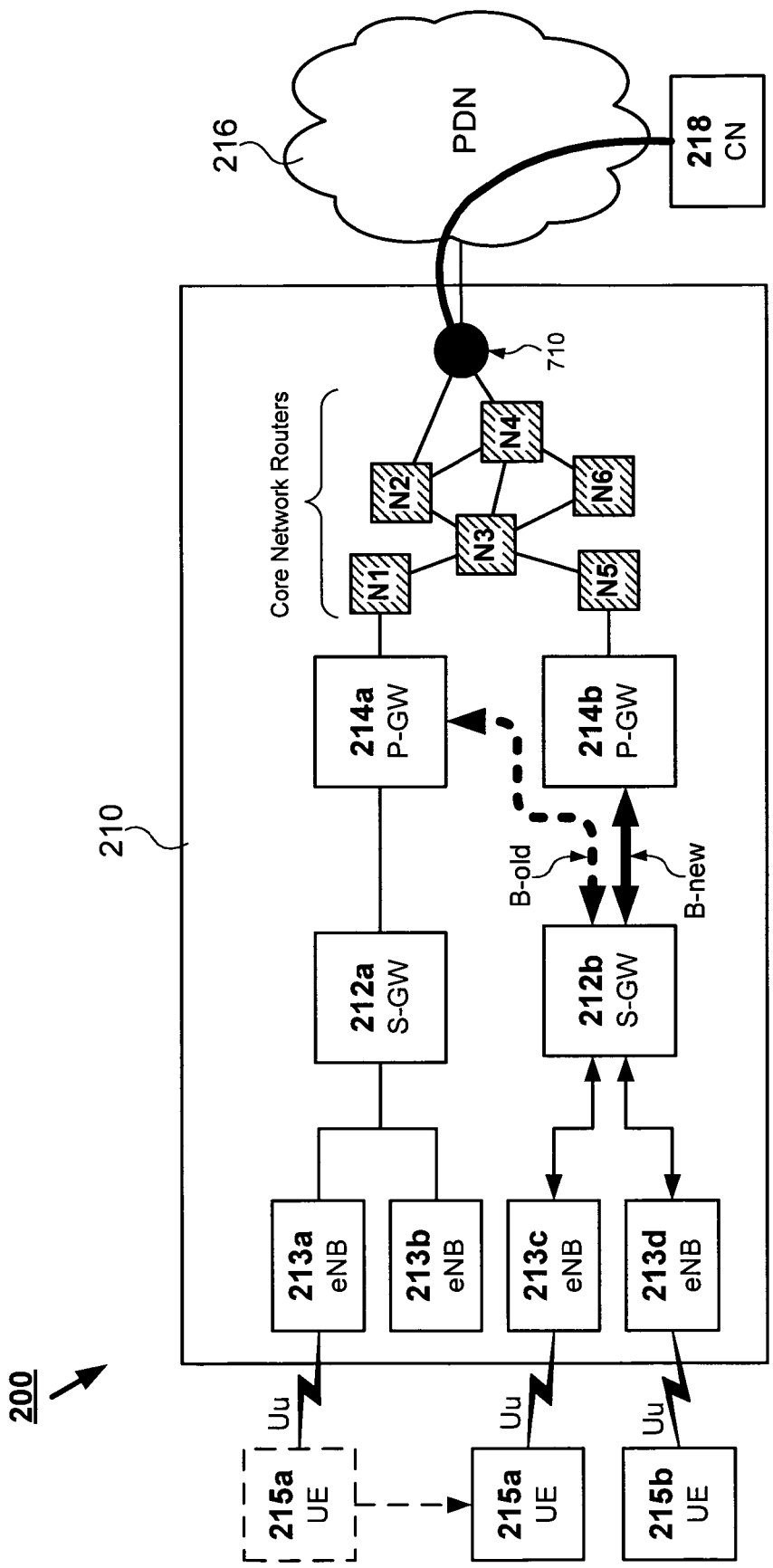
FIG. 7 is a schematic illustration of the LTE system 200 in FIG. 2 illustrating re-routing by means of a dynamic routing protocol.

FIG. 7 shows the LTE system 200 described above with reference to FIG. 2, although a few components have been omitted for the sake of clarity. In addition to the components previously described with reference to FIG. 2 it can be seen in FIG. 7 that the EPS 210 may comprise a number of Core Network Routers N1-N6 and an Edge Router 710 or similar system boarder router. In addition, there may be a Public Data Network 216 and a Correspondent Node (CN) 218 configured to communicate with an UE 215a, 215b via the PDN 216 and the EPS 200.

Various core routers, system boarder routers, PDN:s and correspondent nodes as those now mentioned are well known to those skilled in the art and there is no need for a detailed description. However, a few explanatory remarks will be given below.

The core network routers N1-N6 are configured to provide routing paths for communicating user-data for an UE 215a, 215b between the IP anchor P-GW 214a, 214b of the UE 215a, 215b on one hand and the Edge Router 710 on the other hand.

The Edge Router 710 or similar is placed at the edge of the EPS 210 as an interface between the EPS 210 and the PDN 216, e.g. such as the Internet or similar data packet network. The Edge Router 710 is configured to receive user-data from the CN 218 or similar attached to the PDN 216. Depending on the UE 215a, 215b being addressed by the CN 218, the received user-data is forwarded by the EPS

200 to the appropriate P-GW 214a, 214b via the routing paths provided by the core network routers N1-N6. Conversely, user-data sent from an UE 215a, 215b to the CN 218 is received by the Edge Router 710 and forwarded to the appropriate recipient in the PDN 216 for further distribution to the CN 218.

Now, since the IP anchor point has been relocated from P-GW 214a to P-GW 214b for the UE 215a a solution to the classical IP mobility problem is to let a dynamic routing protocol handle the exception of the UE 215a not residing at its original anchor point P-GW 214a. This can be achieved by the new P-GW 214b using Open Shortest Path First (OSPF, see e.g. RFC 2328 (1998) for IPv4 or RFC 5340 (2008) for IPv6) or Intermediate System to Intermediate System (IS-IS, see e.g. ISO/IEC 10589:2002 or RFC 1142) or any other suitable Interior Gateway Protocol (IGP) to notify the core network routers N1-N6 that the UE 215a has a new IP anchor point P-GW 214b with a new IP-address. In addition, the P-GW 214a, the P-GW 214b and/or the Edge Router 710 should preferably be notified in the same or similar manner. The notified core network routers N1-N6 has been shaded in FIG. 7. Data packets destined for the UE 215a will find their way to the new P-GW 214b e.g. due to longest prefix match.

Another solution for handling the exception of the UE 215a not residing at its original anchor point P-GW 214a is to let the management plane of the EPS 210 in the LTE system 200 to use policy based routing rules in the core network routers N1-N6. Policy based routing is well known to those skilled in the art and there is no need for a detailed description. However, the following overview may be given.

Normally, when a router receives a data packet it decides where to forward it based on the destination address in the packet, which is then used to look up an entry in a routing table. However, in some cases, there may be a need to forward the packet based on other criteria, a so-called policy. A policy-based routing may e.g. be based on the size of the packet, the protocol of the payload, or some other characteristic. It may also be based on a combination of characteristics. Policy-based routing may e.g. be based on the source and the destination. This permits routing over different links or towards different networks depending on where the packet is originating from, even if the destination is the same.

Figure 8:
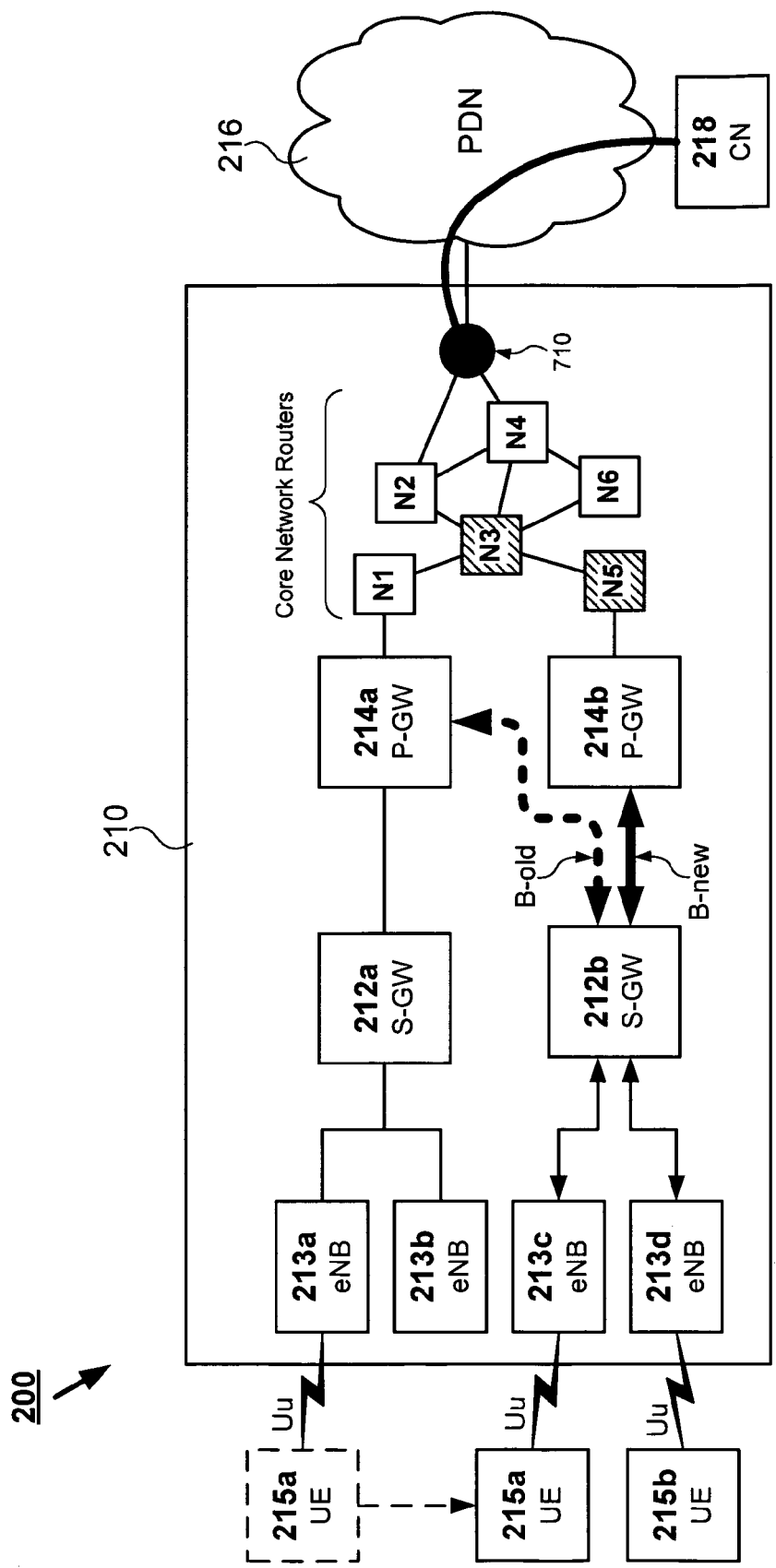
FIG. 8 is a schematic illustration of the LTE system 200 in FIG. 2 illustrating re-routing by means of policy based routing rules.

According to the above, a solution under policy-based routing may e.g. have the effect that user data between the new anchor point P-GW 214b and the Edge Router 710 is only communication via the core network routers N3-N5. Preferably all core network nodes N1-N6 may be notified about the IP-address of the new IP anchor point P-GW 214b for the UE 215a. In addition, the P-GW 214a, the P-GW 214b and/or the Edge Router 710 should preferably be notified in the same or similar manner. The example shown in FIG. 8 illustrates that it may be sufficient to only notify the core network routers N3 and N5 about the IP-address for the new IP anchor point P-GW 214b for the UE 215a. The notified core network routers N3 and N5 have been shaded in FIG. 8.

Figure 9:
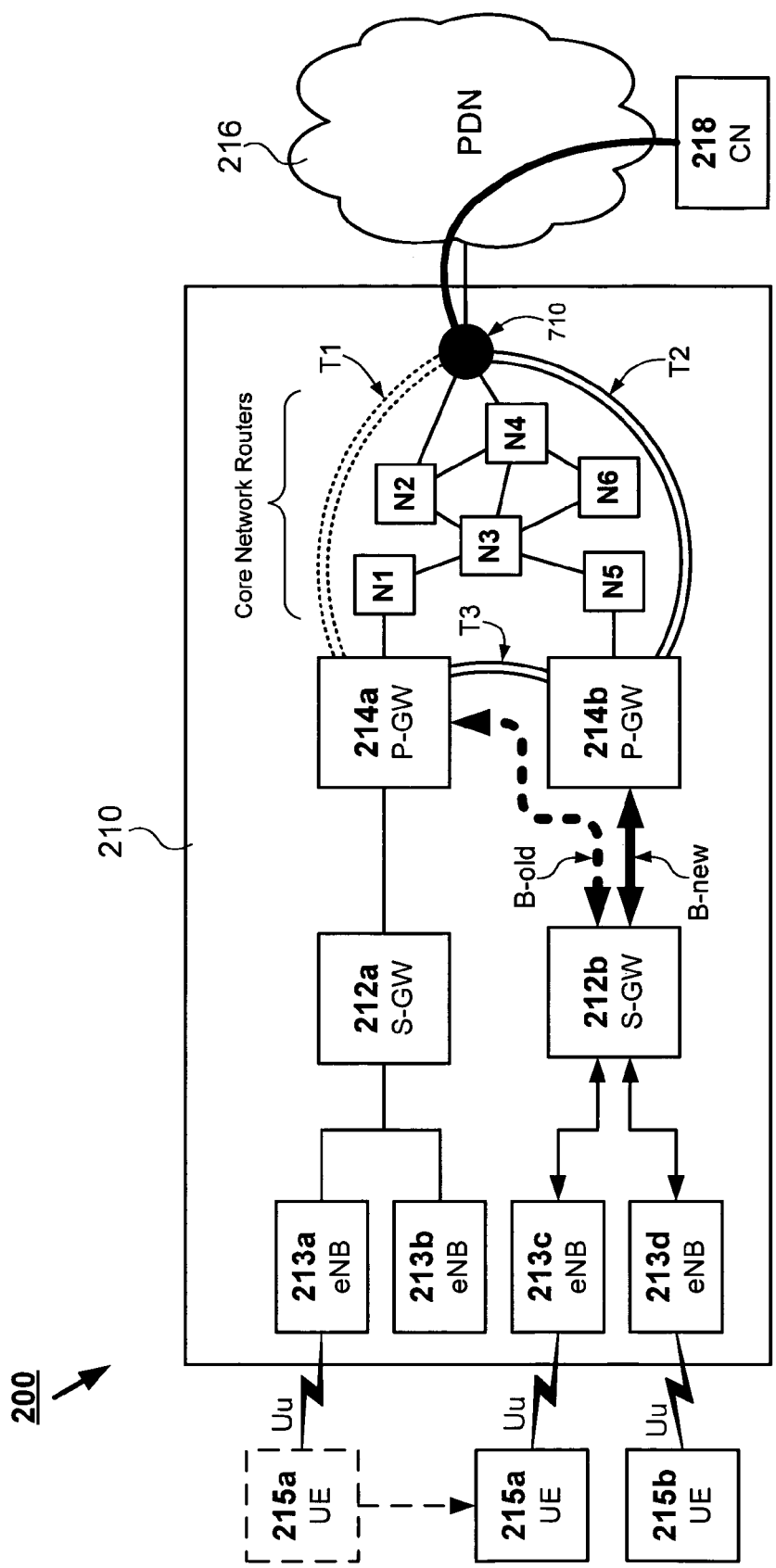
FIG. 9 is a schematic illustration of the LTE system 200 in FIG. 2 illustrating re-routing by means of pre-established IP tunnels.

Still another solution for handling the exception of the UE 215a not residing at its original anchor point P-GW 214a is to use a set of IP-tunnels. IP-tunnels need no further description since they are well known to those skilled in the art and commonly used in e.g. IPv4 and IPv6. As shown in FIG. 9 it is preferred that a first tunnel T1 is established between the old P-GW 214a and the Edge Router 710, and that a second tunnel T2 is established between the new P-GW 214b and the Edge Router 710. It is also preferred that a third tunnel T3 is established between the old P-GW 214a and the new P-GW 214b, or at least that IP connectivity or similar communication means is established between the old P-GW 214a and the new P-GW 214b. Then, when anchor relocation occurs for the UE 215a the notification of the core network routers N1-N6 can be done by simply informing the end-points of the tunnels T1-T2 about the relocation of the anchor point for the UE 215a. This is preferably done by the new P-GW 214b, which accordingly sends information to the Edge Router 710 enabling it to bind the IP address of the UE 215a and the IP address of the new P-GW 214b with the effect that user-data to the UE 215a will be tunnelled via the second tunnel T2. It is also preferred that the new P-GW 214b sends a request for removing the IP address of the UE 215a from the binding tables of the old P-GW 214a with the effect that user-data to the UE 215a will not be tunnelled via the first tunnel T1. To illustrate the redirection of the tunnels for the UE 215a in FIG. 9, the old tunnel T1 has been illustrated with dashed lines and the new tunnel T2 with solid lines.

Figure 10:
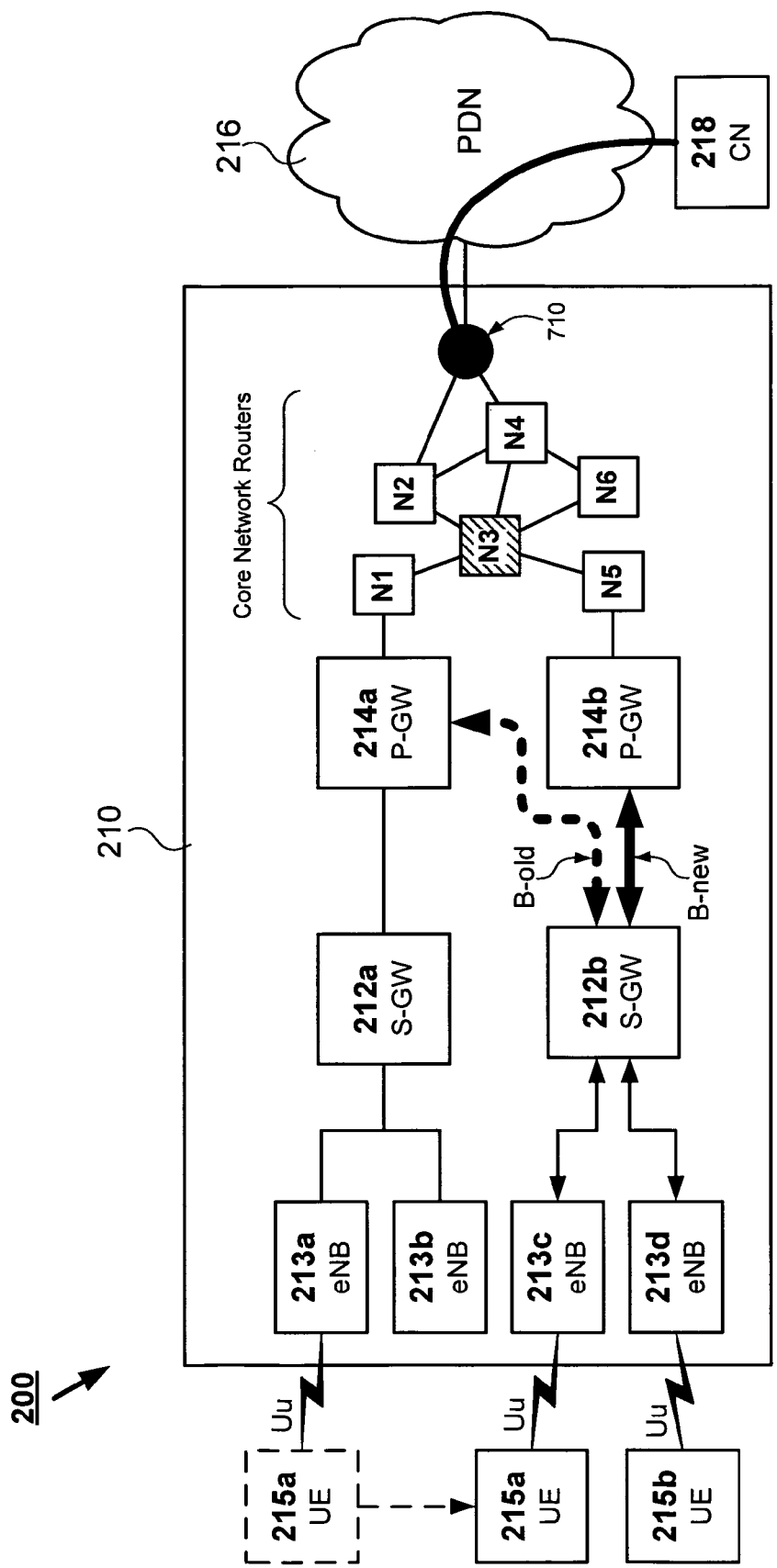
FIG. 10 is a schematic illustration of the LTE system 200 in FIG. 2 illustrating re-routing by notifying a common root router N3.

Yet another solution for handling the exception of the UE 215a not residing at its original anchor point P-GW 214a is to utilize a possible hierarchical structure amongst the core network routers N1-N6. Assume that the core network routers N1-N6 are at least partly arranged in a tree-structure topology such that the old P-GW 214a and the new P-GW 214b have a common root router in the tree of routers. It is then sufficient to notify the common root router N3 that the UE 215a has a new anchor point P-GW 214b at which it can be reached. In FIG. 10 the shaded router N3 is the common root router for both P-GW 214a and P-GW 214b. The new P-GW 214b may e.g. use OSPF or IS-IS routing protocols to notify the root router N3 about the new IP address of the new P-GW 214b.

As a remark to both the first and the second embodiment as described with reference to FIG. 3-6, but also with respect to the routing problems just discussed with reference to FIG. 7-10, it should be mentioned that the Mobility Node 111 or the MME 211 should limit the anchor relocation frequency. For example, anchor relocation may be a problem if the number of relocated UE:s is above or in the order of a few hundred thousands and/or if there are frequent relocations amongst a large number of UE:s.

Indeed, a frequent relocation and notifying of the core network routers N1-N6 is an overhead for the routing system. Similarly, in case individual routes are used in each or many routers for each UE with a relocated anchor this might be a problem of the number of relocated terminals is above or in the order of a few hundred thousands.

Still, the operator of the EPS 210 has clear control of the routing load imposed by the relocation procedure by constraining the anchor relocation frequency in the MME 211. This is particularly so since the MME 211 is the entity that initiates the relocation procedure for a UE 215a, 215b. If the network management system finds that routing control plane is close to being saturated, it can instruct the MME 211 to not initiate relocations for some time or to delay the relocations with some time, so that the routing control plane load is balanced. Additionally or alternatively, the threshold or similar for constraining the relocation activity may be set and/or detected by the MME 211 itself.

In essence, the MME 211 may constrain the relocation in case a predetermined relocation threshold is exceeded. The predetermined relocation threshold may e.g. be set according to empirical knowledge and/or according to theoretical calculations and simulation of the optimal behaviour of the LTE system 200 and the EPS 210 therein. The predetermined relocation threshold may also be dynamically changed as the preconditions changes, e.g. if the number and/or behaviour of the attached UE:s changes and/or the configuration of the EPS 210 changes etc.

The routing described above with reference to the EPS 200 in FIG. 7-10 applies mutatis mutandis with respect to the Packet System 110 shown in FIG. 1 assuming it comprises core network routers N1-N6 in the same or similar manner as shown in FIG. 7-10.

The present invention has now been described with reference to exemplifying embodiments. However, the invention is not limited to the embodiments described herein. On the contrary, the full extent of the invention is only determined by the scope of the appended claims.

The invention claimed is:

1. A method for relocating the mobility anchor for a Mobile Terminal in a wireless communication system, which method performed in a Serving Node comprises the steps of:
   receiving from a Mobility Node a request for redirecting a first bearer for the Mobile Terminal between the Serving Node and a first mobility anchor so as to create a new second bearer between the Serving Node and a second mobility anchor;
   transmitting to the first mobility anchor a request for deleting the first bearer; and
   transmitting to the second mobility anchor a request for establishing the second bearer;
   wherein the request for establishing the second bearer comprises an IP address for the mobile terminal for binding to the second bearer;
   wherein additional steps performed in the Mobility Node comprises:
      constraining an allowable Mobile Terminal relocation frequency depending on a number of Mobile Terminal relocations managed by the Mobility Node over a defined time period.

2. The method according to claim 1, wherein:
the new second bearer is created while the Mobile Terminal is continuously attached to the wireless communication system.

3. The method according to claim 1,
wherein the first bearer and the second bearer are default bearers.

4. The method according to claim 1, wherein additional steps performed in the Mobility Node comprises:
   transmitting the request for redirecting the first bearer for the Mobile Terminal in response to a determination that the Mobile Terminal is more locally positioned with respect to the second mobility anchor than with respect to the first mobility anchor.

5. The method according to claim 1,
wherein additional steps performed in the Mobility Node comprises:
   buffering user-data received from the Mobile Terminal at least until the reception of a response indicating that the second bearer has been established; and
wherein additional steps performed in the first mobility anchor and the second mobility anchor comprises:
   buffering received user-data destined for the Mobile Terminal in the first mobility anchor at least until the first mobility anchor is notified about the second mobility anchor for the Mobility Node, and then transmitting the buffered user-data from the first mobility anchor to the second mobility anchor.

6. The method according to claim 1,
wherein
   the transmission to the second mobility anchor of the request for establishing the second bearer comprises an indication informing the second mobility anchor that it should prepare to receive bearer states for the first bearer from the first mobility anchor; and
wherein additional steps performed in the second mobility anchor comprises:
   receiving at least one bearer state of the first bearer from the first mobility anchor for restoring the bearer states for the second bearer so as to be comparable to the bearer states for the first deleted bearer.

7. The method according to claim 1, wherein:
at least one core network router of the wireless communication system is notified about the IP address of the second mobility anchor of the Mobile Terminal by:
   the second mobility anchor using a dynamic routing protocol to notify the core network routers; or
   a management plane of the wireless communication system using policy based routing rules in the core network routers to notify these routers; or
   pre-establishing a first tunnel between the first mobility anchor and a system border router, and a second tunnel between the second mobility anchor and the system border router, and the second mobility anchor notifying the end-points of the established tunnels; or
   the second mobility anchor notifying a common root router for the first and second mobility anchors.

8. A Serving Node arrangement configured to operatively communicate user-data of a Mobile Terminal via a first bearer established between said Serving Node arrangement and a first mobility anchor, wherein the Serving Node arrangement comprises:
   a receiver configured to receive from a Mobility Node a request for redirecting the first bearer so as to create a new second bearer between said Serving Node arrangement and a second mobility anchor; and
   a transmitter configured to:
      transmit to the first mobility anchor a request for deleting the first bearer;
      transmit to the second mobility anchor a request for establishing the second bearer;
   wherein the request for establishing the second bearer comprises an IP address for the mobile terminal for binding to the second bearer;
   wherein the Mobility Node is configured to constrain an allowable Mobile Terminal relocation frequency depending on a number of Mobile Terminal relocations managed by the Mobility Node over a defined time period.

9. The Serving Node arrangement according to claim 8, wherein the node arrangement is configured to operatively:
   receive a response indicating that the second bearer has been established; and
   buffer user-data, received from the Mobile Terminal at least until the response is received.

10. A Mobility Node arrangement configured to manage bearers for communicating data of a Mobile Terminal between a Serving Node arrangement and a first mobility anchor or a second mobility anchor, wherein the Mobility Node arrangement comprises:
   a transmitter configured to transmit to a Serving Node a request for redirecting a first bearer for the Mobile Terminal between the Serving Node and a first mobility anchor so as to create a new second bearer between the Serving Node and a second mobility anchor; and a processor configured to operatively constrain an allowable Mobile Terminal relocation frequency depending on a number of Mobile Terminal relocations managed by the Mobility Node over a defined time period.

11. The Mobility Node arrangement according to claim 10, wherein:

the Mobility Node is configured to operatively transmit the request in response to a determination that the Mobile Terminal is more locally positioned with respect to the second mobility anchor than with respect to the first mobility anchor.

12. The Mobility Node arrangement to claim 10, wherein:

the Mobility Node is configured to operatively transmit the request while the Mobile Terminal is continuously attached to the wireless communication system.

* * * * *